Jan. 27, 1970   D. R. HERRIOTT ET AL   3,492,493
PHOTOCHROMIC OPTICAL FIBER SWITCH
Filed Dec. 16, 1966   4 Sheets-Sheet 1
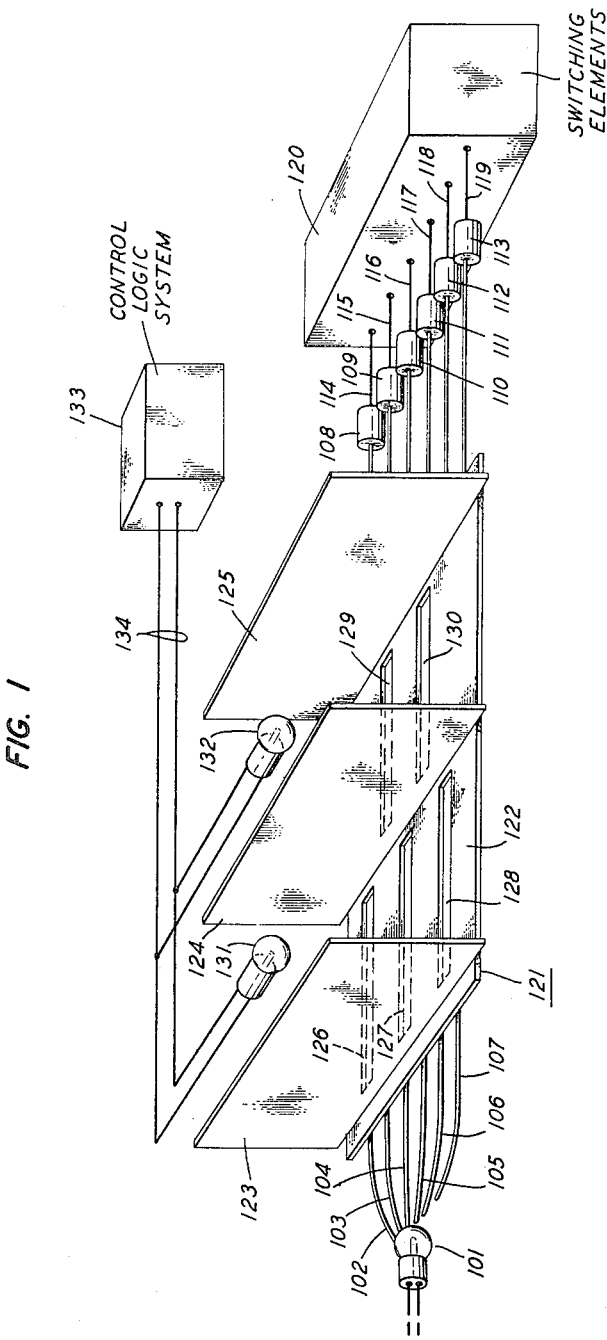
FIG. 1
INVENTORS: D.R. HERRIOTT
C.M. PLEASS
ATTORNEY United States Patent Office 3,492,493
Patented Jan. 27, 1970

3,492,493
PHOTOCHROMIC OPTICAL FIBER SWITCH
Donald R. Herriott, Morris Township, Morris County, and Charles M. Pleass, Bernardsville, N.J., assignors to Bell Telephone Laboratories, Incorporated, Murray Hill, N.J., a corporation of New York
Filed Dec. 16, 1966, Ser. No. 602,238
Int. Cl. G02b 5/14
U.S. Cl. 250—227                                    2 Claims

ABSTRACT OF THE DISCLOSURE

Each of a plurality of photocells is controlled by directing light of a first frequency to the photocell through a respective photochromic optical fiber and light transmission through selected ones of the fibers is blocked by exposing them to light of a second frequency so that operation of the photocells is made correspondingly selective.

---

This invention relates to photochromism and more particularly to the utilization of photochromic materials in controlling the transmission of light over discrete conducting paths.

Molecules or complexes which experience reversible photo-induced color changes upon exposure to high frequency radiation, such as ultraviolet light, for example, are termed photochromic. In the absence of activating radiation, a photochromic system has a single stable electronic configuration with a characteristic absorption spectrum. When the system is irradiated, however, its absorption spectrum changes, for example from colorless to purple, from red to green or from red to purple. In many instances, when the irradiation source is removed, the system reverts to its original state spontaneously. In other instances irradition with a different wavelength occasions the reversion. Temperature of the system also forms a useful device variable since in general the rate of spontaneous reversion is accelerated by increasing temperature. Changes in transmissivity of light through the material accompany the changes in the absorption spectra.

Photochromic phenomena have been studied for a number of years from the standpoint of both theory and practical application, see for example the review "Photochromism" by R. Dessauer and J. P. Paris published in "Advances in Photochemistry," vol. 1, pp. 275-321, 1963, Interscience Publishers, New York, N.Y. Thus far, however, many of the theoretical aspects are not fully understood and commercial applications are few and limited in scope, although proposals for practical use cover a wide field, including such diverse areas as photographic processing, data storage and light sensitive "automatic sun tan" toy dolls.

With the advent of practical laser development and the accelerating need for increased speed and bandwidth capacity in virtually all forms of electrical communication, a new awareness has developed with respect to the potential of communication systems utilizing light. A number of problems remain to be solved, however, before any substantial realization of this potential can be achieved.

One problem, for example, relates to the lack of suitable means for controlling light transmission selectively among a plurality of communication paths—the type of control that is essential in complex communication systems such as telephone systems. Indeed there appears to be no fully effective means in the prior art for controlling light transmission in a single discrete path. Electromechanical means such as relays, for example, are clearly unsuitable and light sensitive solid state devices, such as photocells and the like which are useful in providing optical-electrical translation, do not provide control over light transmission per se.

Some advances have been made in the area of fiber optics to the end that various forms of glass and plastics have been employed successfully in fiber form to establish discrete light conducting communication paths. The basic problem of providing selective control for the transmission of light over plurality of paths, however, remains unsolved.

Accordingly, one object of the invention is to improve the effectiveness of controlling light transmission in a discrete transmission paths.

Another object is to facilitate the selective transmission of light among a plurality of discrete transmission paths.

The principles of the invention are based in part on the realization that the light transmissivity changes that occur in photochromic materials in response to exposure to radiation from certain defined portions of the light spectrum may advantageously be turned to account in controlling the transmission of other portions of the light spectrum along discrete transmission paths.

In one illustrative embodiment of the invention, selective control over light transmission in one or more of a plurality of light conducting paths is effected by directing control radiation of a preselected frequency against photochromic light conducting fibers in accordance with a correspondingly selective code or program. The overall function accomplished is the same as that performed in the telephone switching art by apparatus commonly identified as a card translator of the type shown by C. B. Brown et al. in Patent 2,734,821 issued Dec. 18, 1956. In the card translator, communication paths are established by directing a light beam to impinge upon selected photocells. Selectivity is achieved by placing an apertured card between the light source and the cells, the particular pattern of the apertures in the card being determinative of the particular cells or communication paths to be activated. Mechanical positioning of the cards is effected by solenoids suitably controlled by logic circuitry that is programmed to reflect the origin, route and destination of a particular call.

In accordance with the invention, the need for mechanical positioning of apertured cards is avoided. Any one of a plurality of control light sources is selectively energized and its output is directed to a corresponding portion of a single, fixed apertured coding card. The apertures on the card are suitably positioned to permit light from the control source to impinge upon only selected ones of a group of photochromic fibers. The photochromic in the exposed fibers is responsive to the control radiation to the extent that light transmission is restricted at frequencies in the photochromic absorption bands of the excited photochromic. A common light source is positioned to direct its beam against the input end of each of the fibers and the output end of each is in juxtaposition to a respective photocell. In accordance with the invention, light from the common source is of a selected frequency that is transmitted effectively by the ground state of the photochromic and is substantially absorbed by the excited state of the photochromic. The output from photocells corresponding to unimpaired transmission paths may then be utilized to activate electrically responsive switching elements.

In another embodiment of the invention the selectively energized phosphors of a cathode ray tube are employed to supply control radiation that is directed to corresponding selected photochromic fibers that are positioned in a suitable array across or embedded in the face plate of the tube. Once again selected ones of the photochromic fibers, each corresponding to a particular communication path, are conductively enabled without the need of mechanical actuation of code plates.

The principles of the invention as well as additional objects and features thereof will be fully apprehended from the following detailed description of selected illustrative embodiments and from the drawing in which:

FIG. 1 is a sketch of a light actuated switching system in accordance with the principles of the invention;

As indicated above, the functions performed by a type of telephone switching apparatus commonly termed a card translator may also be performed by a system embodying the key features of the invention. Such a switching system is shown in FIG. 1. A group of light conducting fiber optic elements, or optical fibers, 102 through 107, is placed in a substantially coplanar parallel array between a light source 101 and a respective group of photocells 108 through 113. Optical fibers are well known in the art and include a number of various types as disclosed, for example, by E. D. Grim in a paper, "Development and Application of Fiber Optics Techniques to Precision Measuring Devices, Transducers and Automatic Control Systems," published in the Proceedings of the Electronic Components Conference, Washington, D.C., May 8–10, 1962. One type, for example, is a fine filament of glass, typically circular in cross section, having a high index of refraction surrounded by a thin jacket of lower index glass. The net result of such a configuration is that a light ray entering one end of the element is reflected internally from wall to wall with low loss, finally emerging at the opposite end. In effect, the fiber acts as a waveguide for the incident light. Such fibers can be fabricated with diameters of less than .001 inch without impairing their desirable high resolution and low loss characteristics.

In accordance with the invention each of the optical fibers 102 through 107, which may be of the type described or of other suitable form such as a flat tape or the like, additionally includes a photochromic substance such as fluorescein, for example, or an analogue having an excited state with appropriate decay constants.

Alternatively, the optical or photochromic fibers 102 through 107 may take the form of a glass shell containing a photochromic liquid or solution of high index. A wide variety of photochromics are available in liquid or solution form and their reversion times are normally many orders of magnitude faster than solid photochromics. Methyl iodide is a typical example of a photochromic liquid with suitable characteristics.

Figure 4:
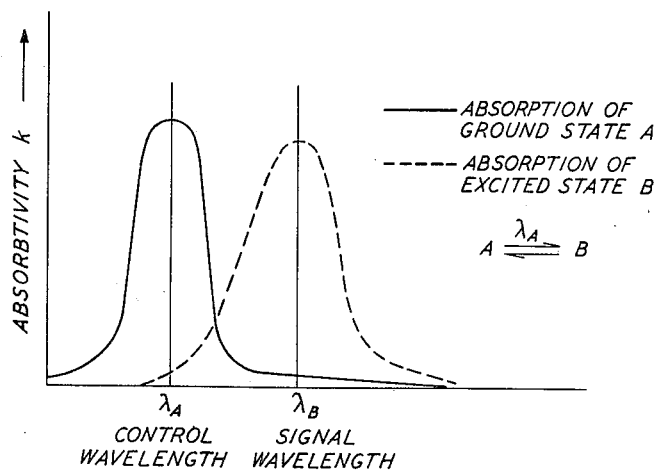
FIG. 4 is a plot of absorbtivity versus wavelength illustrating the characteristics of a photochromic optical fiber in accordance with the invention.

Irrespective of the particular type of fiber that is employed in accordance with the invention and irrespective of whether the photochromic is in a solid state or in a liquid form, the absorbtivity versus wavelength characteristics take the form illustrated in FIG. 4. The plot indicates that when a photochromic material is irradiated by a frequency $\lambda_A$, absorbtivity changes as shown, centered about a second frequency $\lambda_B$.

The electrical output of each of the photocells 108 through 113, as shown in FIG. 1, is applied to means by corresponding leads 114 through 119 to corresponding switching elements, such as switching transistors, for example, illustrated diagrammatically by the block 120. A pair of light sources 131 and 132 with a radiation frequency $\lambda_A$ are disposed, as shown, above the optical fibers 102 through 107. The operation of the light sources 131 and 132 is effected by a control logic system 133, shown in block form, which corresponds in function and which may correspond substantially in structure to the control logic employed to operate the card-actuating solenoids of a card translator of the type disclosed by C. B. Brown et al. in the patent cited above.

In accordance with the invention, a shield structure 121 is placed between the light sources 131 and 132 and the array of optical fibers 102 through 107. The shield structure 121, which may be an integral structure of any suitable opaque material, includes vertical shields 123, 124 and 125 and a horizontal apertured shield 122. The apertured shield 122 includes apertures 126, 127 and 128 that expose fibers 102, 104 and 107 respectively to light from the source 131. Inasmuch as the transmission of light frequency $\lambda_B$ from the source 101 is blocked in any of the fibers 102 through 107 that are exposed to light of frequency $\lambda_A$ from source 131, light does not reach photocells 108, 110 or 113, and thus only photocells 109, 111 and 112 are activated which in turn activates corresponding switching elements 120. If instead, light 132 is activated by the control logic system 133, fiber 103 is exposed to light rays of frequency $\lambda_A$ through the aperture 129, and fiber 105 is similarly exposed through aperture 130. In this event photocells 109 and 111 are made inoperative since light transmission from the source 101 is blocked in the corresponding fibers 103 and 105.

Figure 2:
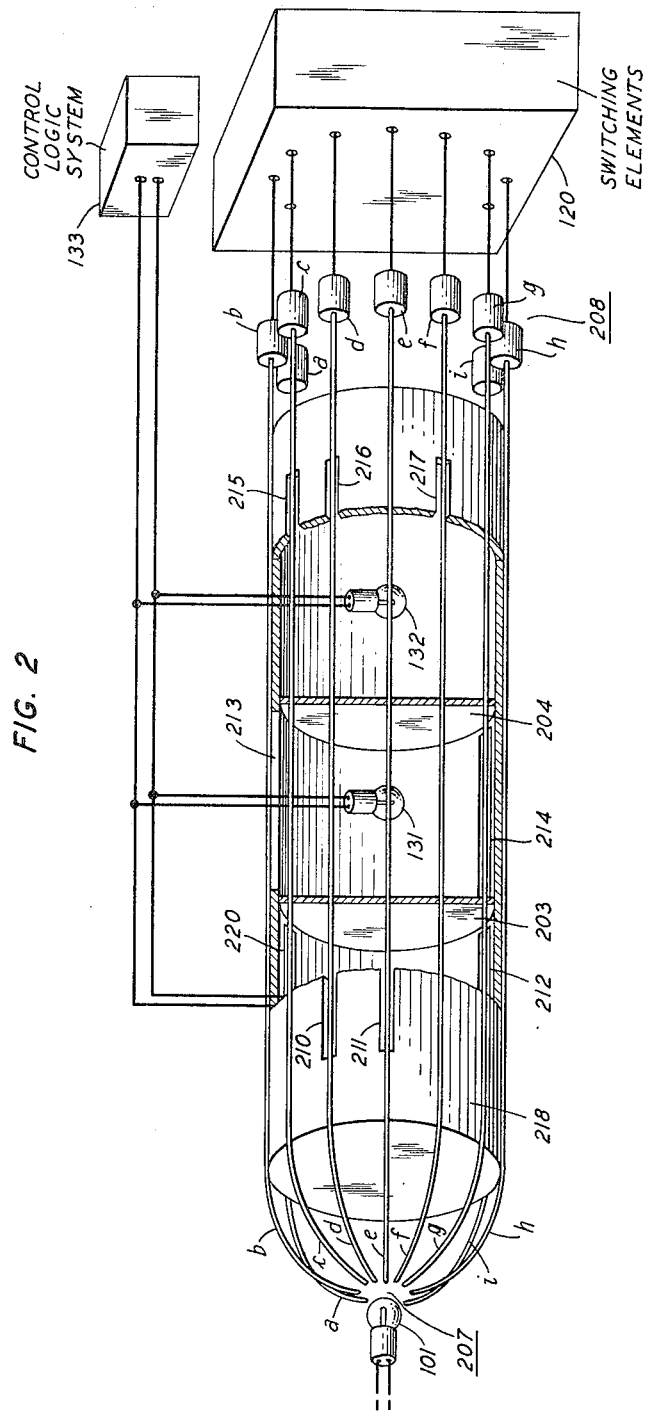
FIG. 2 is a modified form of the system shown in FIG. 1.

A photochromic translator substantially identical in principle to that shown in FIG. 1 but somewhat different in form is shown in FIG. 2. The photochromic optical fiber array 207, which includes individual fibers 207a through 207i, is arranged on the inner surface of a cylindrical slotted mask 218. A shield structure which may be formed of any suitable opaque material and which may be integral with the mask 218 includes a plurality of shielding discs, two of which 203 and 204 are shown. Light of frequency $\lambda_B$ from a first source, not shown, is directed to fibers 207a, 207d, 207e and 207i through slots 220, 210, 211 and 212 respectively. Similarly, slots 213 and 214 exposed fibers 207b and 207i to radiation from the source 131 and slots 215, 216 and 217 expose fibers 207c, 207d and 207f to radiation from the source 132. The number of control light sources, fibers and fiber-exposing slots may obviously be multiplied in accordance with the requirements of the particular system.

The photocell array 208, including individual photocells 208a through 208i, is arranged to conform to the cylindrical disposition of the optical fiber array 207. Switching elements 120 and the control logic system 133 perform in the manner indicated above in the description of the system shown in FIG. 1.

Figure 3:
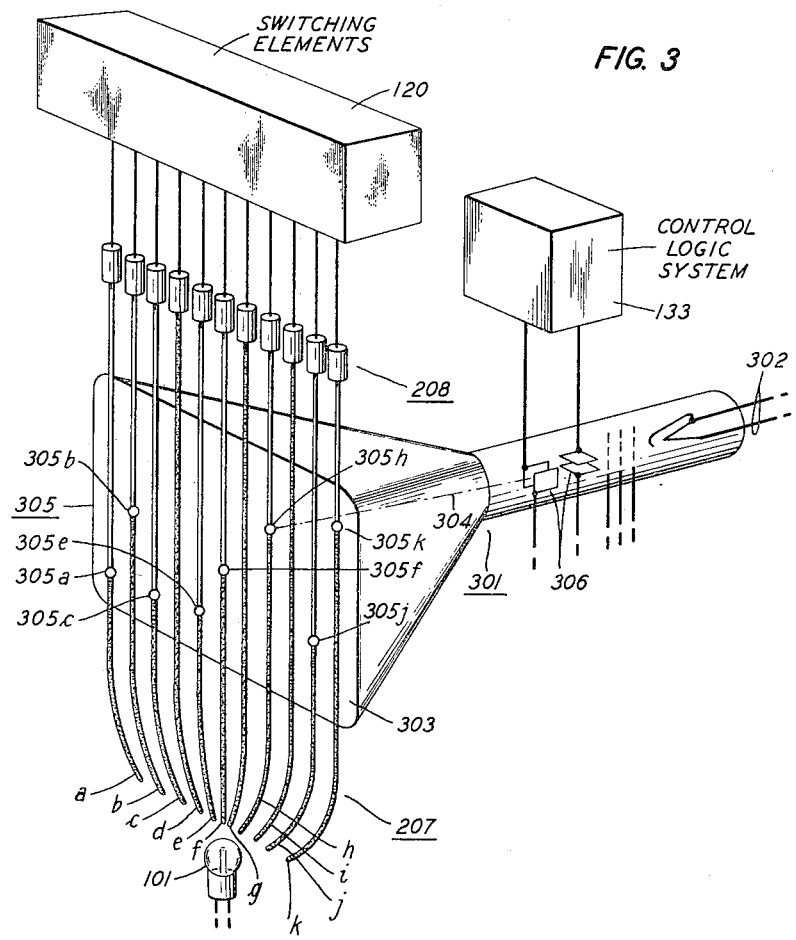
FIG. 3 is a sketch of a second embodiment of the invention employing a cathode ray tube as the control light source.

In the embodiment of the invention shown in FIG. 3 a cathode ray tube 301 provides the necessary control illumination of frequency $\lambda_A$ for an array of photochromic fibers 207 as an electron beam 304 impinges upon selected ones of the phosphors 305a through 305k of the phosphor array 305 on the tube face 303. The electron beam 304 is positioned after leaving the gun 302 by the control logic system 133 which applies suitable potentials to the vertical and horizontal deflecting plates 306. As shown, the electron beam 304 has been directed to impinge upon a selected one of the phosphors 305h that is in alignment with a corresponding one of the fibers 207h. The electron beam 304 excites the phosphor 305h to radiate light energy of frequency $\lambda_A$ into the fiber 207h thus blocking transmission from the light source 101 to the corresponding photocell in the photocell array 208. As shown, transmission in the fibers 207a, 207b, 207c, 207d, 207e, 207j and 207k has similarly been blocked by radiation from corresponding phosphors in the phosphor array 305. Transmission in fibers 207h, 207g and 207i has been left unimpaired.

Corresponding ones of the switching elements 120 are thus made operative or left unoperated in accordance with an electrical output or the absence of such an output from associated ones of the photocells 208. Fibers 207a through 207k may be placed across the face 303 of the cathode ray tube 301 in the manner shown or they may be suitably imbedded therein.

Figure 5:
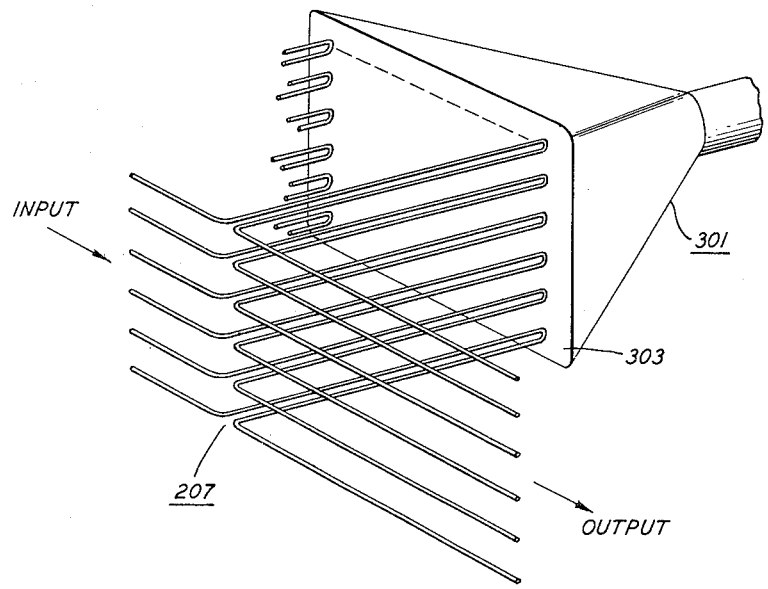
FIG. 5 is a sketch of a modified version of the embodiment shown in FIG. 3.

In order to expand the capacity of a switching system of the type shown in FIG. 3 the photochromic fibers 207 may be placed in an array as shown in FIG. 5. Each of the fibers 207 is looped with the bight thereof placed in proximity to a corresponding one of the tube phosphors, not shown. Similar groups of looped fibers may then be arranged along each row or column of phosphors on the tube face 303.

Sources of control radiation other than the excited phosphors shown in FIG. 3 may be employed in accordance with the invention. For example, an array of electroluminescent diodes may be utilized with excitation of the diodes provided by an electron beam scan or, alternatively, by the switching of electrical pulses carried on conductive materials linking the diode array.

Figure 6:
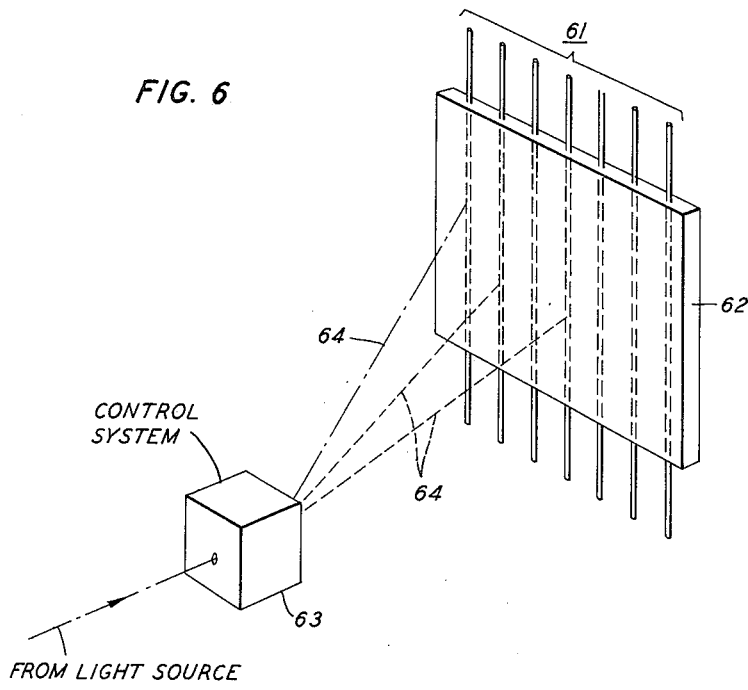
FIG. 6 is a sketch of an embodiment wherein the photochromic fibers are embedded in a flat plate member.

The principles of the invention may be implemented also by other arrangements that are functionally similar to but physically quite different from the cathode ray tube embodiments illustrated in FIGS. 3 and 5. For example, as shown in FIG. 6, high index photochromic fibers 61 may be imbedded in a plate 62 of low index material to form discrete light conducting channels. Transmissivity of the fibers 61 is selectively controlled by positioning a light beam 64 by a suitable control system 63 which may, for example, employ light reflection from ultrasonic wavefronts.

It is to be understood that the embodiments shown herein are merely illustrative of the principles of the invention and various modifications thereto may be effected by persons skilled in the art without departing from the spirit and scope of the invention.

What is claimed is:

1. Apparatus for controlling the transmission of light along a plurality of paths in accordance with a preselected program comprising, in combination, a plurality of photochromic fibers arranged in a substantially parallel array, a first light source of a first frequency composition, means for directing the output of said first source into said fibers thereby to effect conduction of said output by each of said fibers, a plurality of second light sources of a second frequency composition, means for directing the output of a selected one of said second light sources into a corresponding unique number of said fibers in accordance with said program thereby to block transmission of light from said first source through said last named fibers, each of said fibers including respective input and output terminals, said input terminals of each of said fibers being positioned for the reception of light from said first source, a plurality of utilization means each operatively responsive to light from said first source and each being positioned adjacent to a respective one of said output terminals, said directing means including a plurality of shield members, adjacent pairs of said shield members being positioned to ensure the direction of light from respective ones of said second sources to respective portions of said fibers and a plurality of apertured plate members each bounded by a respective one of said adjacent pairs, the apertures of each of said plates being arranged in accordance with a respective preselected code to permit light from each of said second sources to impinge upon only preselected ones of said fibers in accordance with said preselected code.

2. Apparatus for selectively controlling the transmission of light along a plurality of paths in accordance with a preselected program comprising, in combination, a plurality of photochromic optical fibers arranged in a substantially parallel array forming a cylindrical pattern, each of said fibers having respective input and output terminals, means for directing light of a first frequency into said input terminals thereby to effect transmission of said light through said fibers to said output terminals, a plurality of sources of light of a second frequency, an apertured shielding plate positioned between said array and said sources and including groups of apertures therein, each of said groups of apertures exposing corresponding ones of said fibers to light from a respective one of said sources, said apertured shielding plate being a substantially cylindrical member with said fibers arranged along the inner surface thereof, a plurality of disc-like shielding plates each substantially perpendicular to the axis of said apertured shielding plate, each adjacent pair of said disc-like plates preventing light from all but one of said sources from reaching a corresponding group of said apertures and said fibers associated therewith, means for placing selected ones of said sources in a lighted condition in accordance with a preselected program, whereby transmission of light of said first frequency is blocked by light of said second frequency in those of said fibers exposed to light of said second frequency and utilization means responsive to light output of said first frequency from said output terminals.

References Cited

UNITED STATES PATENTS

| | | | |
|---|---|---|---|
| 1,150,356 | 9/1964 | Newman | 250—227 X |
| 3,225,207 | 12/1965 | Connors et al. | 250—237 |
| 3,315,082 | 4/1967 | Milroy | 250—227 |
| 3,331,920 | 7/1967 | Larson. | |
| 3,400,214 | 9/1968 | Hamann | 250—227 X |
| 3,401,268 | 9/1968 | Lea. | |
| 3,402,300 | 9/1968 | Pearl. | |
| 3,409,404 | 11/1968 | Fergason. | |

ROBERT SEGAL, Primary Examiner

U.S. Cl. X.R.

350—96, 160